Jan. 2, 1934.  H. E. WARREN  1,942,076
SELF STARTING SYNCHRONOUS MOTOR
Filed Oct. 19, 1931
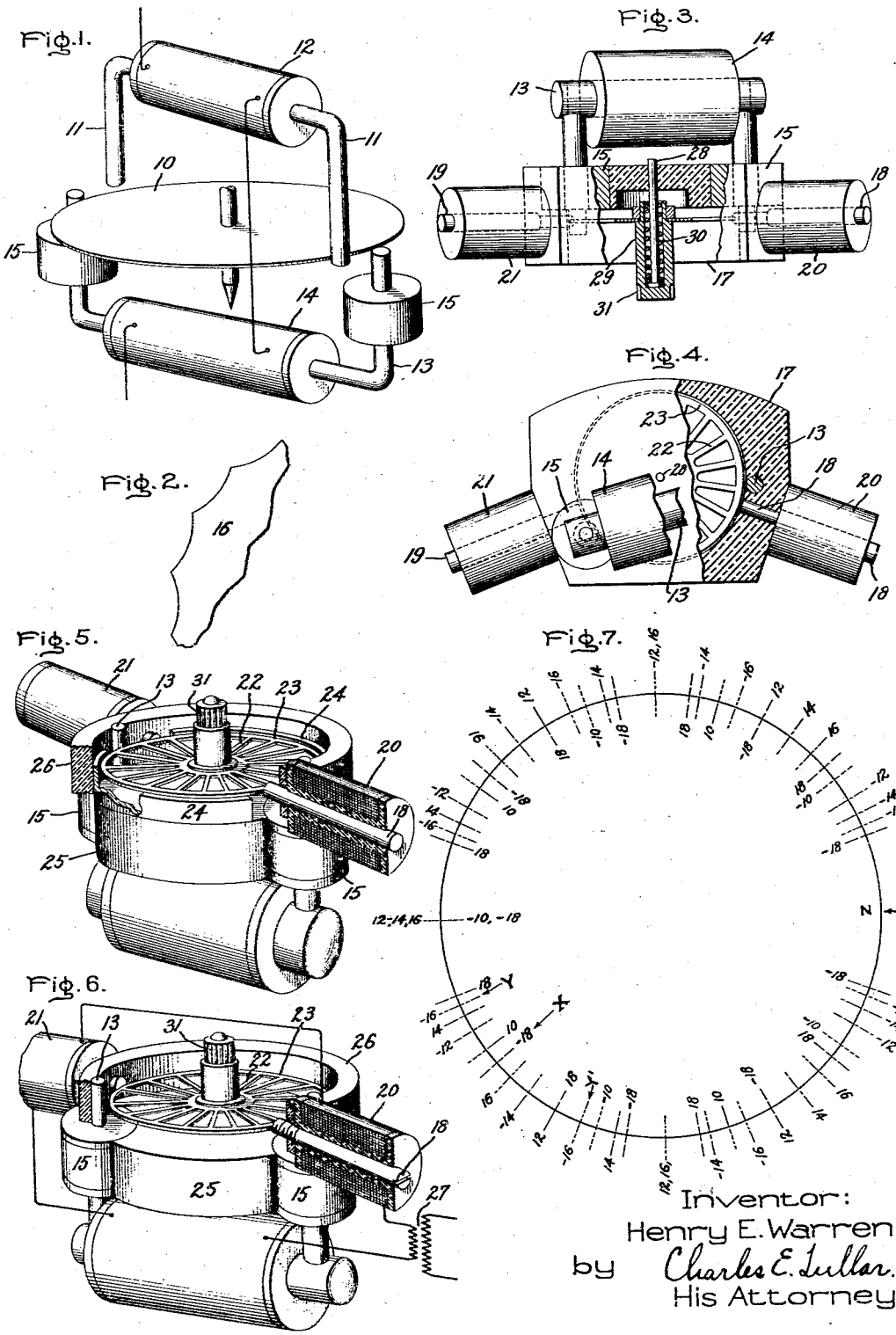
Inventor:
Henry E. Warren,
by Charles E. Lullan.
His Attorney.

Patented Jan. 2, 1934

1,942,076

UNITED STATES PATENT OFFICE 1,942,076

SELF-STARTING SYNCHRONOUS MOTOR

Henry E. Warren, Ashland, Mass., assignor to Warren Telechron Company, Ashland, Mass., a corporation of Maine Application October 19, 1931. Serial No. 569,606

10 Claims. (Cl. 172—278)

My invention relates to small alternating current motors. Its primary object is to provide a low-speed, low-cost, motor of the self-starting synchronous type such as may be used for driving timing devices when the motor is energized from an alternating current source of regulated frequency. Certain features of the invention will be found useful in the construction of motors which are not necessarily self-starting or synchronous in their operation and thus, while the main purpose of the invention is to provide a small low cost motor of the self-starting synchronous type, the invention is not confined thereto. In carrying my invention into effect I make use of very small salient stator poles for concentrating torque producing fluxes of great intensity at properly spaced points about the armature. The preferred form of armature takes the form of a very light thin steel wheel, the rim of which is utilized primarily for starting purposes and the spokes of which are utilized primarily for producing synchronous operation.

The features of the invention which are believed to be novel and patentable will be pointed out in the claims appended hereto. For a better understanding of the invention reference is made in the following description to the accompanying drawing.

The drawing shows some of the more important structures employed in the development of the present invention as well as the more preferred form since it is believed that the present invention can best be explained by referring to the development and noting the characteristics obtained and the reasons for the more important changes made at different stages of such development. Fig. 1 represents an early form of the invention employing a non-polar steel disk rotor. Fig. 2 shows how such a disk rotor may be modified to provide salient poles; Figs. 3 and 4, side and plan views partially in section showing a form of the invention in which the unshaded poles extend radially from the rotor and employ no outer magnetic return circuit. The poles are not diametrically opposite as in Figs. 1 and 5. The rotor of this modification is of magnetic material in the form of a wheel. Fig. 5 is a modification with the addition of a magnetic damper around the greater circumference of the rotor to provide a damping load to prevent the rotor from operating at a synchronous speed higher than that desired. The spacing between the shaded and unshaded poles is adjustable in this modification. Fig. 6 shows a more preferred form of the invention with a pole spacing selected so as to respond to only one synchronous speed. When this is done the magnetic damper of Fig. 5 is unnecessary; and Fig. 7 is a pole spacing chart which will be referred to in explaining how to select the most desirable pole spacing so as to avoid one which is responsive to more than one synchronous speed.

In the design of prior art motors of the shaded pole type, it has heretofore been the practice so far as I am aware to make the magnetic circuit for the energizing electromagnet of appreciable cross-section and in general operate it below saturation at the maximum flux densities used. In the motor of my invention the core portions of the electromagnets may be and preferably are of relatively small cross-section. The shaded core or pole portions are separated from the unshaded portions and the two portions have separate energizing windings. The magnetic circuits generally operate at a much higher flux density than normal. In general, the pole pieces are saturated over a substantial portion of the flux waves. The air gap fluxes between stator and rotor are thus concentrated and confined to relatively small areas. A material saving in iron and copper as well as a smaller than usual motor results. The saving in iron and overall dimensions may be still further increased by omitting the usual return magnetic circuit for the main pole flux. The shaded and unshaded poles, being separated, may be easily adjusted with respect to each other and be placed to the best advantage from the standpoints of torque and space economy.

The essential parts of an early although not the earliest form of the motor is shown in Fig. 1. The rotor in this instance comprises a disk 10 of magnetic material such as hardened steel. The unshaded or unlagged flux is obtained from the U-shaped magnetic core portion 11 provided with the energizing coil 12. The shaded or lagged flux is obtained from a second U-shaped core portion 13 provided with the energizing coil 14 and having flux lagging coils or closed bands 15 near the pole tips. The two coils 12 and 14 are connected in series to a suitable source of alternating current supply. The two U-shaped core members terminate in pole tips closely adjacent the edge of the disk. Fluxes of opposite polarity occur at the pole tips of core member 11, which fluxes reverse with the alternations in the supply current. Similarly, fluxes of alternate polarity occur at the pole tips of core member 13 which reverse with the alternations. Owing to the shading coils 15 which may be closed bands of copper, the fluxes from these poles lag behind the fluxes from the unshaded poles. We thus obtain an alternating field across a diameter of the rotor which shifts from a line between the unshaded poles to a line between the shaded poles and vice versa. These fluxes tend to set up remanent magnetic poles in the edge of the disk and by properly spacing the two adjacent shaded and unshaded poles we can obtain synchronous rotation in the direction of flux shift. At the proper speed the disk tends to become polarized with alternate north and south poles about its periphery. The number of such poles is divisible by two but not divisible by four, due to the fact that poles of alternate polarity are diametrically opposite. The motor has a synchronous torque and speed depending upon the number of such poles and is self-starting. The number of such poles which are thus set up in the periphery of the disk depends upon the relative lag produced by the shading coils and the spacing of shaded and unshaded poles. The motor is of the remanent or hysteresis type and may be made of very compact and inexpensive construction owing to the utilization of a rotary field component produced by separate shaded and unshaded poles in which the flux is highly concentrated and of great intensity at properly spaced points about the rim of the disk. It is probable that the magnetic circuits are saturated over a large portion of a flux alternation. The amount of iron employed in the field structure is obviously very materially less than in the usual shaded pole motor and due to the small diameter of the coils, the amount of copper necessary is likewise materially less than usual.

It was found that a motor with a plain disk as in Fig. 1 could not develop any great amount of synchronous torque due to a tendency of the remanent magnetic rotor poles to slip upon the application of load.

Improvement in this respect was obtained by providing a salient pole disk, but it was found that if the salients were too prominent the motor becomes non-self-starting. A disk rotor with properly spaced shallow scallops cut in its periphery as represented at 16 in Fig. 2, which shows a portion of such a rotor, increases the synchronous torque somewhat without destroying the self-starting characteristics. These scallops assist in maintaining the remanent poles fixed in position in the rotor and thus increases the synchronous torque. With the diametrical arrangement of poles as shown in Fig. 1, the number of scallops should be divisible by two but not by four, and the adjacent shaded and unshaded poles adjusted so that at the desired synchronous speed a salient pole in the rotor periphery comes opposite the field poles in synchronism with the dephased fluxes thereof.

The motors above described may be reversed by moving the shaded poles about the rotor periphery from one side to the other of the unshaded poles or by reversing the relative polarity of the adjacent shaded and unshaded poles.

Figs. 3 and 4 show different views of the motor with further modifications and improvements. A supporting structure 17 for the rotor bearing and field assembly is shown and may comprise suitably molded insulating material. The shaded coil field section is substantially similar to that already described, and its parts are indicated by the same reference characters as in Fig. 1. The unshaded pole field is different in the following respects. Its pole pieces 18 and 19 extend radially from the rotor periphery at right angles to the shaded pole pieces and there is no magnetic return circuit between them outside the rotor making it necessary to employ energizing coils 20 and 21 on both sections. This unipolar arrangement decreases the necessary depth of the motor in the direction of its axis of rotation. The omission of a magnetic return circuit does not interfere with the operation, and one of these unlagged unipolar field sections may be omitted entirely with no other result than that of correspondingly reducing the motor torque. The fact that the unshaded pole flux enters the rotor in a radial instead of an axial direction appears to have little if any effect upon the operation. The poles are not positioned on a diameter of the rotor, as in Fig. 1, but are nevertheless spaced a distance apart corresponding to an eneven number of poles.

The rotor of Fig. 4 is patterned like a wheel with spokes 22 and a rim 23. This form of rotor improves the starting torque materially and allows ample salient pole effect due to the outer extremities of the spokes becoming polarized to keep the remanent poles formed in the rotor from shifting after synchronous speed is established. The spokes are the synchronizing elements and the rim the self-starting element of this rotor, and the relative dimensions of these parts are important if best results are to be obtained. This is particularly true of the radial thickness of the rim. The narrower the rim section, measured in a radial direction, the better the performance down to a point where the salient pole effect of the spokes predominates and the motor is no longer self-starting. A rim with a radial width of .025 inch in a disk .01 inch thick and .88 inch outside diameter gives good results both with regard to starting and synchronizing torque. Thinner rims decrease the starting torque and if made much thinner the motor will be non-self-starting. Thus, the characteristics of the motor may be varied materially by small changes in the rim thickness.

The diameter of the pole tip used in some of these earlier motors was $\frac{1}{16}$ inch in diameter although the remainder of the poles were in some cases of larger section. It was later found expedient to make the poles $\frac{3}{32}$ inch in diameter and use a uniform cross-section, not because of any special advantage in operating characteristics of the motor but rather to facilitate the manufacture of the coils which are more easily wound on the larger diameter arbors. It is of course not essential that the field iron be of round cross-section.

In motors such as shown in Figs. 1 and 5, where the corresponding pole portions are diametrically opposite each other it was found that the motor could be made to have more than one synchronous speed. If for any reason the rotor was forced sufficiently above the lowest synchronous speed it would establish itself at a new synchronous speed by reason of there being formed a greater number of remanent poles in the rotor periphery corresponding to some number divisible by two but not by four. In some applications two or more synchronous speeds might be advantageous, but in most cases this is undesirable, and the motor of Fig. 5 was designed to overcome this characteristic.

In addition to the parts already described this motor has a stationary damper member 24 made of soft iron closely surrounding the rotor rim 23 except for spaces opposite the poles where it is cut away. The function of this damper is to provide a slight magnetic drag or load on the rotor preventing it from overspeeding or prevent it from maintaining an over-speed condition in case it is over-speeded from some outside cause. This damping action is produced by the motion of the remanent poles in the rotor in close proximity to the shield. As is well known, such damping action increases with speed so that it is an easy matter to have this damping torque exceed the synchronous motor torque at any speed above that desired. At the desired synchronous speed and below, the damping torque is made insufficient to interfere with the operation. The damping torque may be varied by varying the air gap between the damper 24 and the rotor rim.

In this modification as well as in the motor of Fig. 6, the supporting structure or casing is made in two parts, 25 and 26, part 25 supporting the motor bearing and shaded pole field structure and part 26 supporting the two unshaded pole structures. The two parts of the casing are rotatable with respect to each other permitting the spacing between the shaded and unshaded pole tip to be adjusted. Such adjustment permits the best angular relation for any given rotor to be easily determined. If a plain disk rotor such as shown in Fig. 1 is used, the pole adjustment permits various synchronous speeds to be obtained with different adjustments. A small motor of this character easily adjustable to obtain various synchronous speeds has not heretofore been available. In the modifications of Figs. 4, 5, and 6 the unshaded poles 18 and 19 may be adjusted radially. In Figs. 4 and 5 the poles are held friction-tight in the casing and in Fig. 6 the poles are threaded through the supporting casing. Such radial adjustments were particularly useful in the experimental development work but may also be advantageous in commercial motors to adjust for different conditions. The shaded poles may also be adjusted towards and away from the rotor and in this way the most desirable air gap relation for any given condition of line voltage or operating characteristic desired may be obtained. The air gap relations represented in the drawings have been found satisfactory and in general are materially less than in most motors.

As has been explained above, when the poles are arranged on a diameter of the rotor it is possible to establish two or more numbers of remanent magnetic poles in the rotor periphery divisible by two but not by four, such for example, as 18, 22, 26, etc., and I have explained how by the use of a magnetic damper the higher synchronous speed tendencies due to this characteristic of the motor, may be avoided. I will now explain how the cause of this multiple synchronous speed tendency may be removed entirely. Briefly stated, this is done by so positioning the stator poles that their angular spacing corresponds to some definitely selected equally spaced rotor pole number and synchronous speed, but which does not correspond to any other equally spaced rotor pole number and synchronous speed within the operating range of the motor. To accomplish this object, the stator poles are not positioned 180 mechanical degrees apart, but at some other angle in accordance with the principles now to be explained in connection with the pole spacing chart of Fig. 7.

On this chart I have shown possible stator pole spacings for 10, 12, 14, 16, and 18 rotor poles.

Let it be assumed that one of the stator poles is to be positioned at the arrow marked O and we wish to determine where the other stator pole should be positioned so as to obtain only one particular selected synchronous speed and no other. By a stator pole I refer here to a pole unit comprising the adjacent shaded and unshaded pole sections. Let us assume it is desired to obtain a synchronous speed of 400 R. P. M. with a supply frequency of 60 cycles. From the well known speed formula of synchronous machines, $$\text{speed} = \frac{F \times 120}{N}$$

where F=frequency and N the pole number. We note that the rotor must have 18 poles. The other synchronous speed points which may be troublesome are those corresponding to such numbers as 16, 14, 12, 10, etc., or synchronous speeds which are above 400 R. P. M., but not so far above but what a motor of the type described might operate synchronously if brought up to such speeds. For synchronous speeds lower than 400 R. P. M. such as for 20, 22 poles, etc., the same treatment described below may be followed; but in general this is unnecessary, since the motor is intended to have sufficient starting torque to predominate over any synchronous speed below that desired.

Starting at point O on the chart of Fig. 7, and assuming that this point corresponds to a north pole, we first divide the periphery into ten equally spaced points, designated by the reference character 10. Alternate points are preceded by a minus sign, thus, "−10", to indicate the positions of negative poles for a ten-pole synchronous speed. We do the same for 12, 14, 16, and 18 poles, designating these points by the corresponding indications.

Now, if we place one stator pole at O, we may place the alternate stator pole at any point marked −18 and obtain an 18 pole synchronous motor. However, in certain of these positions, particularly the position diametrically opposite to O, we note that we may also obtain 10 and 14 pole speeds. Consequently, if we wish to obtain only the 18 pole speed, we select a position such as X, which corresponds only to the position of a negative pole of an 18 pole motor having a positive pole at O.

Thus a motor intended for a synchronous speed of only 400 R. P. M. on 60 cycles should preferably have its stator poles spaced apart as just indicated. If we wish to design for a 16 pole speed, the stator poles may be placed at O and Y, or O and Y', etc. In this way the formation of alternate north and south remanent poles in the rotor periphery are favorable for only the one synchronous speed within a wide speed range, and experiments have demonstrated the correctness of the theory.

The pole spacing represented in Fig. 6 is in accordance with the principle just described. The number of salient rotor poles 22, as well as the spacing of the stator poles, should correspond to the synchronous speed desired.

The motor of Fig. 6 is substantially the same as that of Fig. 5, except for the stator pole spacing and the omission of the damping member 24, which is, of course, unnecessary where the stator pole spacing is such that there is only one synchronous operating speed. In general, the motor does not require 110 volts alternating current even with the coils connected in series. Fig. 6 shows the use of a step-down transformer 27 between the motor and source of supply to reduce the motor voltage.

In the motor of the invention, the shaded poles are entirely separated from the unshaded poles, and separate coils are used for their energization. This permits a certain amount of flexibility with respect to the angle of flux shift between the shaded and unshaded poles not present in the usual motor. It has been explained how the mechanical angle of spacing between adjacent shaded and unshaded poles may be varied. The time angle of flux shift may also be varied. In the usual shaded pole motor the shaded flux lags behind the unshaded flux by some angle, such as 45 electrical degrees. Let us assume that in the motor of the present invention the shaded and unshaded pole coils are so connected that the adjacent pole pieces produce fluxes of the same polarity at any instant except for the usual angle of lag produced by the shading coils, which we may assume, for illustration purposes, is 45 degrees. We may now reverse the energizing coils for the unshaded coils and obtain an angle of flux shift in the same direction of rotation of 225 degrees, or 135 degrees considered in the opposite direction, or we may reverse only one of the coils and obtain 45 and 135 degree angles of flux shift in opposite directions of rotation at opposite poles of the motor. The proper mechanical spacing between shaded and unshaded poles for the 45 degrees, 135 degrees, and 225 degrees phase shift will be different. It is seen, therefore, that various different operable combinations of polarity, phase shift, and mechanical spacing may be used between the shaded and unshaded poles, and that the motor may be reversed by reversing the relative polarity of the shaded and unshaded poles without interchanging the positions of such poles.

I have found that for an 18 pole speed motor best results are obtained by having adjacent shaded and unshaded poles of opposite polarity and spaced apart about 15 mechanical degrees of the rotor periphery. By an 18-pole speed, applicant means that synchronous speed which ordinarily would be produced by an 18-pole motor. For example, 400 R. P. M. with a 60 cycle 18-pole motor, according to the relation expressed in the well known equation, "Speed in R. P. M. is equal to the frequency times 120 divided by the number of poles." This spacing corresponds to about 135 electrical degrees. Only two sets of stator poles have been illustrated in the drawing, and this is sufficient for driving such devices as clocks; but the torque may be increased by adding additional sets of poles properly spaced about the rotor periphery.

Owing to the high intensity of the field fluxes and the use of an air return path for the unshaded pole flux as illustrated in certain of the motors, the motor is somewhat sensitive to stray fields, and if used closely adjacent to other electrical apparatus from which stray fields emanate the motor should be properly shielded.

Any suitable form of bearing and terminal shaft arrangement may be used with this motor. One form of bearing is shown in Fig. 3. Here a rigid pin 28 is secured in the housing 17. The rotor is fastened to a hub 29 closed at one end and slipped over the end of the pin 28. A hardened steel coiled spring 30 is interposed between pin 28 and the inner wall of the hub 29. Lubricating oil may be contained between the turns of the spring and conveyed to all parts of the bearing surface which is between the spring and pin. A pinion gear may be cut in the hub as indicated at 31.

What I claim as new and desire to secure by Letters Patent of the United States, is:

1. An alternating current motor comprising a magnetic disk rotor and a stator comprised of two separate U-shaped magnetic members, each having a single phase field winding, said field members having pole pieces located closely adjacent the periphery of the disk and with the pole pieces of different members spaced apart a short distance in the peripheral direction of the disk, one of said members having closed conductors about its pole pieces to lag the flux thereof with respect to the flux of the other field member, said field members being of reduced cross-section such that they operate under saturated conditions.

2. An alternating current motor comprising a hardened steel magnetic disk rotor, a stator having relatively adjustable salient magnetic pole pieces for producing out of phase fluxes of alternating polarity at closely spaced peripheral points about the rotor, producing remanent poles in the rotor and a synchronous speed corresponding to such pole number and the spacing of the out of phase fluxes, and means whereby the mechanical spacing between said out of phase flux producing means may be varied to produce a different number of remanent rotor poles and a different synchronous speed.

3. An alternating current motor comprising cooperating stator and rotor, the stator comprising at least two separate magnetic field members each having its own single phase energizing winding, each field member having at least one pole piece positioned closely adjacent the periphery of the rotor, means for lagging the flux of a pole piece of one of said members with respect to the flux of a pole piece of another member, such lagged pole piece being spaced closely to an unlagged pole piece of the other member about the periphery of the rotor and cooperating therewith to produce a shifting magnetic field in the rotor, said field members being relatively adjustable to vary the spacing of the lagged and unlagged pole fluxes of such motor.

4. An alternating current motor having a rotor and a stator, the stator comprising a bi-polar member with lagged pole pieces closely adjacent the rotor at different peripheral points thereof, and a pair of field members each having a single unlagged pole piece, said pair respectively cooperating with the pole pieces of the bi-polar member to produce two sets of shifting fluxes at different points of the rotor periphery, the pole pieces of the bi-polar member approaching the rotor in an axial direction, and the pole pieces of the other members approaching the rotor in radial directions, the latter having no magnetic return circuit outside of the rotor for the unlagged fluxes and single phase windings on each field member connected in series relation.

5. An alternating current motor comprising a disk-shaped rotor made of hardened steel and having an even number of spokes and a thin rim section, as in a wheel, a stator comprising three separate field members, one for producing a bi-polar alternating magnetic field at different peripheral points of the rotor and the other field members each producing uni-polar alternating magnetic fields of opposite polarity respectively closely adjacent to said peripheral points of the rotor, closed conductors on the pole pieces of the bi-polar field member for causing the fluxes produced thereby to be out of phase with the fluxes produced by the other field members, whereby shifting magnetic fields of opposite polarity are produced at the two peripheral rotor points, said field cooperating with the rim section of the rotor to produce starting torque, and with the spokes of the rotor to establish a synchronous speed at which the outer extremities of the spokes are polarized as alternate remanent magnetic poles.

6. An alternating current motor provided with a thin hardened steel rotor shaped like a wheel with an even number of spokes, said number being greater than two, and with a thin rim, a stator member provided with means for producing shifting magnetic fields at two spaced points about the rotor periphery, the spacing of said points corresponding to an uneven number of rotor spokes and the fields at said points being of alternating polarity, said fields cooperating with the rim section of the rotor to produce starting torque, and with the spokes to produce a synchronous torque at a speed where the outer extremities of the spokes are alternately polarized as north and south remanent poles by said fields.

7. An alternating current motor comprising a rotor and a shaded pole stator, the unshaded and shaded pole portions being made of separate magnetic sections relatively adjustable with respect to each other and with respect to the rotor for the purpose of adjusting the spacing between shaded and unshaded fluxes and adjusting the air gap between the rotor and the different polar portions of said stator.

8. An alternating current motor having a thin steel rotor with a plurality of spokes divisible by two but not by four and a thin rim, a stator having means for producing shifting magnetic fields of opposite polarity in the periphery of said rotor at diametrically opposite points thereof, said field cooperating with the rim of said rotor to produce starting torque, and with the spokes of said rotor to produce alternate remanent magnetic poles therein and a synchronous operating speed corresponding to such remanent poles, and a stationary magnetic member located closely adjacent the rotor between the points where the fields are produced and cooperating with the remanent magnetism in the rotor to produce damping for preventing the establishment of a synchronous operating speed higher than that desired.

9. An alternating current motor having a thin steel rotor provided with an even number of evenly spaced spokes, greater than two, and with a rim as in a wheel, a stator having pole pieces for producing highly concentrated shifting magnetic field pole fluxes of opposite polarity at at least two different points about the periphery of said rotor, said points being spaced apart a distance corresponding to an uneven number of rotor spokes, and cooperating with the rim section of the rotor to produce starting torque, and with the spokes thereof to produce a synchronous torque at a speed where said field fluxes polarize the outer portions of the spokes with alternate north and south remanent magnetic poles, the spacing of said pole pieces being so selected as to correspond to such synchronous speed, but to be improperly spaced for the formation of a different number of remanent magnetic rotor poles and other synchronous speeds within the operating range of the motor.

10. An alternating current motor comprising cooperating stator and rotor, the stator comprising two separate magnetic field members each having its own single phase energizing winding, each field member having at least one pole piece positioned closely adjacent the periphery of the rotor, means for lagging the complete flux of one field member with respect to the complete flux in the other field member, a pole piece of one field member being spaced closely to a pole piece of the other member about the periphery of the rotor and cooperating therewith to produce a shifting magnetic field in the rotor, said pole pieces being of sufficiently small cross-section with respect to the magnetizing force of the field elements and the diameter of the rotor that said poles are saturated over appreciable portions of the flux cycles and produce highly concentrated flux pulsations of great intensity confined to relatively small areas of the rotor periphery.

HENRY E. WARREN.